(12) United States Patent
Wall et al.

(10) Patent No.: US 9,008,616 B2
(45) Date of Patent: Apr. 14, 2015

(54) POINT OF SALE PROCESSING INITIATED BY A SINGLE TAP

(75) Inventors: Jonathan Wall, San Francisco, CA (US); Rob von Behren, Berkeley, CA (US); Ismail Cem Paya, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/315,818

(22) Filed: Dec. 9, 2011

(65) Prior Publication Data

US 2013/0046643 A1   Feb. 21, 2013

Related U.S. Application Data

(60) Provisional application No. 61/525,722, filed on Aug. 19, 2011.

(51) Int. Cl.
| | | |
|---|---|---|
| *H04M 11/00* | (2006.01) | |
| *G06Q 20/00* | (2012.01) | |
| *G06Q 30/06* | (2012.01) | |
| *G06Q 20/32* | (2012.01) | |
| *G06Q 30/02* | (2012.01) | |

(52) U.S. Cl.
CPC ............ *G06Q 30/06* (2013.01); *G06Q 20/3278* (2013.01); *G06Q 30/0238* (2013.01)

(58) Field of Classification Search
None
See application file for complete search history.

(56) References Cited

U.S. PATENT DOCUMENTS

| | | | |
|---|---|---|---|
| 6,005,942 A | 12/1999 | Chan et al. | |
| 6,141,752 A | 10/2000 | Dancs et al. | |
| 6,484,174 B1 | 11/2002 | Wall et al. | |
| 6,647,260 B2 | 11/2003 | Dusse et al. | |
| 7,072,854 B2 * | 7/2006 | Loeser | ............................ 705/21 |
| 7,110,792 B2 | 9/2006 | Rosenberg | |

(Continued)

FOREIGN PATENT DOCUMENTS

| | | |
|---|---|---|
| KR | 10 0121725 | 11/2009 |
| WO | WO 01/22374 A1 | 3/2001 |

(Continued)

OTHER PUBLICATIONS

Hancke et al., "Confidence in smart token proximity: Relay attacks revisited," ISG Smart Card Centre, Royal Holloway, University of London, Egham TW20 0EX, UK, Oct. 2009.

(Continued)

*Primary Examiner* — Mussa A Shaawat
(74) *Attorney, Agent, or Firm* — Johnson, Marcou & Isaacs, LLC

(57) ABSTRACT

Point of sale processing of multiple options is possible with a single tap of a contactless device. The user taps the contactless device in the device reader's radio frequency field. The device reader and the contactless device establish a secure communication channel. Once a secure communication channel is established, the device reader communicates the purchase to the contactless device. The contactless device presents value-added services available to the user. The contactless device communicates the user's selected value-added service(s) to the device reader, and the reader communicates the purchase price of the transaction. The contactless device communicates payment options to the user and then communicates the user-selected payment options to the device reader. The device reader communicates a digital receipt to the contactless device, and the secure communication is terminated.

21 Claims, 4 Drawing Sheets

(56) References Cited

U.S. PATENT DOCUMENTS

| | | | |
|---|---|---|---|
| 7,128,274 B2 | 10/2006 | Kelley et al. | |
| 7,140,549 B2 | 11/2006 | de Jong | |
| 7,152,782 B2 | 12/2006 | Shenker et al. | |
| 7,232,073 B1 | 6/2007 | de Jong | |
| 7,243,853 B1 | 7/2007 | Levy et al. | |
| 7,255,264 B2 | 8/2007 | De Leon | |
| 7,275,685 B2 | 10/2007 | Gray et al. | |
| 7,374,099 B2 | 5/2008 | de Jong | |
| 7,469,151 B2 | 12/2008 | Khan et al. | |
| 7,494,055 B2 | 2/2009 | Fernandes et al. | |
| 7,631,346 B2 | 12/2009 | Hinton et al. | |
| 7,631,810 B2 | 12/2009 | Liu et al. | |
| 7,729,722 B2* | 6/2010 | Rofougaran et al. | 455/550.1 |
| 7,748,618 B2 | 7/2010 | Vawter | |
| 7,764,932 B2* | 7/2010 | Rofougaran et al. | 455/77 |
| 7,784,684 B2 | 8/2010 | Labrou et al. | |
| 7,844,242 B2* | 11/2010 | Rofougaran et al. | 455/333 |
| 7,896,233 B2 | 3/2011 | Phillips | |
| 7,949,309 B2* | 5/2011 | Rofougaran et al. | 455/77 |
| 7,996,320 B2 | 8/2011 | Bishop et al. | |
| 8,005,426 B2 | 8/2011 | Huomo et al. | |
| 8,016,192 B2 | 9/2011 | Messerges et al. | |
| 8,041,338 B2* | 10/2011 | Chen et al. | 455/407 |
| 8,126,806 B1 | 2/2012 | DiMartino et al. | |
| 8,131,596 B2* | 3/2012 | McQuilken | 705/26.1 |
| 8,240,560 B2 | 8/2012 | Adams et al. | |
| 8,358,596 B2* | 1/2013 | Byrne et al. | 370/255 |
| 8,369,889 B2* | 2/2013 | Rofougaran et al. | 455/552.1 |
| 8,379,551 B2* | 2/2013 | Wietfeldt et al. | 370/310 |
| 2001/0018666 A1 | 8/2001 | Sugiyama et al. | |
| 2002/0068554 A1 | 6/2002 | Dusse | |
| 2002/0194138 A1 | 12/2002 | Dominguez et al. | |
| 2005/0071418 A1 | 3/2005 | Kjellberg et al. | |
| 2005/0222961 A1 | 10/2005 | Staib et al. | |
| 2006/0018450 A1* | 1/2006 | Sandberg-Diment | 379/93.12 |
| 2006/0165060 A1 | 7/2006 | Dua | |
| 2007/0099679 A1 | 5/2007 | Saarisalo | |
| 2007/0135164 A1 | 6/2007 | Lee | |
| 2007/0156436 A1 | 7/2007 | Fisher et al. | |
| 2007/0278290 A1 | 12/2007 | Messerges et al. | |
| 2008/0011837 A1 | 1/2008 | Wesley | |
| 2008/0051059 A1 | 2/2008 | Fisher | |
| 2008/0085698 A1 | 4/2008 | Gamm | |
| 2008/0230615 A1 | 9/2008 | Read et al. | |
| 2008/0242237 A1* | 10/2008 | Rofougaran et al. | 455/77 |
| 2008/0242240 A1* | 10/2008 | Rofougaran et al. | 455/86 |
| 2008/0242346 A1* | 10/2008 | Rofougaran et al. | 455/552.1 |
| 2008/0287060 A1 | 11/2008 | Ramsten et al. | |
| 2009/0006263 A1 | 1/2009 | Power et al. | |
| 2009/0068982 A1* | 3/2009 | Chen et al. | 455/407 |
| 2009/0094125 A1* | 4/2009 | Killian et al. | 705/17 |
| 2009/0144161 A1 | 6/2009 | Fisher | |
| 2009/0192935 A1 | 7/2009 | Griffin et al. | |
| 2009/0240626 A1 | 9/2009 | Hasson et al. | |
| 2010/0023449 A1 | 1/2010 | Skowronek et al. | |
| 2010/0049654 A1 | 2/2010 | Pilo | |
| 2010/0086012 A1* | 4/2010 | Rofougaran et al. | 375/219 |
| 2010/0088188 A1 | 4/2010 | Kumar et al. | |
| 2010/0130240 A1* | 5/2010 | Hart | 455/509 |
| 2010/0161403 A1 | 6/2010 | Fisher et al. | |
| 2010/0167646 A1* | 7/2010 | Alameh et al. | 455/41.2 |
| 2010/0174598 A1 | 7/2010 | Khan et al. | |
| 2010/0211504 A1 | 8/2010 | Aabye et al. | |
| 2010/0232474 A1* | 9/2010 | Rofougaran et al. | 375/135 |
| 2010/0257033 A1 | 10/2010 | Roberts et al. | |
| 2010/0268618 A1* | 10/2010 | McQuilken | 705/26 |
| 2011/0034133 A1* | 2/2011 | Rofougaran et al. | 455/77 |
| 2011/0050164 A1* | 3/2011 | Partovi et al. | 320/108 |
| 2011/0076941 A1 | 3/2011 | Taveau et al. | |
| 2011/0093326 A1 | 4/2011 | Bous et al. | |
| 2011/0112968 A1 | 5/2011 | Florek et al. | |
| 2011/0149764 A1* | 6/2011 | Wietfeldt et al. | 370/252 |
| 2011/0171907 A1 | 7/2011 | Jolivet | |
| 2011/0173073 A1 | 7/2011 | Wang et al. | |
| 2011/0177780 A1* | 7/2011 | Sato et al. | 455/41.1 |
| 2011/0187652 A1 | 8/2011 | Huibers | |
| 2011/0191438 A1 | 8/2011 | Huibers et al. | |
| 2011/0191823 A1 | 8/2011 | Huibers | |
| 2011/0202415 A1 | 8/2011 | Casares et al. | |
| 2008/0306849 A1 | 9/2011 | Johnson et al. | |
| 2011/0275421 A1* | 11/2011 | Wong et al. | 455/572 |
| 2011/0292973 A1* | 12/2011 | Kianush et al. | 375/147 |
| 2011/0320293 A1* | 12/2011 | Khan | 705/16 |
| 2012/0015605 A1 | 1/2012 | Sole | |
| 2012/0023026 A1* | 1/2012 | Chen et al. | 705/75 |
| 2012/0078751 A1* | 3/2012 | MacPhail et al. | 705/26.41 |
| 2012/0108173 A1 | 5/2012 | Hahm et al. | |
| 2012/0214411 A1* | 8/2012 | Levy | 455/41.1 |
| 2012/0276938 A1* | 11/2012 | Wagholikar et al. | 455/514 |
| 2012/0329407 A1* | 12/2012 | Rousu et al. | 455/90.2 |
| 2013/0060959 A1* | 3/2013 | Taveau et al. | 709/232 |
| 2013/0080238 A1 | 3/2013 | Kelly et al. | |
| 2013/0090064 A1* | 4/2013 | Herron et al. | 455/41.2 |
| 2013/0093388 A1* | 4/2013 | Partovi | 320/108 |
| 2013/0109433 A1* | 5/2013 | Wang et al. | 455/552.1 |

FOREIGN PATENT DOCUMENTS

| | | |
|---|---|---|
| WO | WO 0152212 A1 | 7/2001 |
| WO | WO 2004/054125 A1 | 6/2004 |
| WO | WO 2006/027646 A1 | 3/2006 |
| WO | WO 2006/111782 A1 | 10/2006 |
| WO | WO 2008/034937 A1 | 3/2008 |
| WO | WO 2009/018255 A2 | 2/2009 |
| WO | WO 2009/036264 A1 | 3/2009 |
| WO | WO 2010144370 A2 | 12/2010 |
| WO | WO 2011/127627 A1 | 10/2011 |

OTHER PUBLICATIONS

Hopping, "Technology in Retail," IBM Corporation, Technology in Society, No. 22, pp. 63-74, 2000.

Design and Implementation of Wireless Payment System Using GVM and MobileC, *Proceedings of the International Conference on Mobile Computing and Ubiquitous Networking*, vol./Iss 1, pp. 1-10, 2005.

Mobile Payments at the Physical Point-of-Sale: Assessing U.S. Market Drivers and Industry Direction, *Smart Card Alliance Report*, vol./Iss PT-05001, pp. 1-52, Apr. 2005.

GlobalPlatform: Contactless Services, Card Specification v2.2 Version 1.0, pp. 1-77, Feb. 2010.

PN533 User Manual Rev. 03, *User Manual*, pp. 1-173, Jan. 14, 2009.

Smart Cards; UICC-CLF Interface: Host Controller Interface P2P, LNC Protocol, *European Telecommunications Standards Intitutte (ETSI)*, vol./Iss 1.0, pp. 1-33, Jan. 11, 2008.

ISO/IEC 21481:2005 Information Technology—Telecommunications and Information Exchange between Systems—Near Field Communication Interface and Protocol-2(NFCIP-2), *International Standard ISO/IEC*, vol./Iss 21481, pp. 1-5, Jan. 1, 2005.

Boly, J. et al., The ESPIRIT project CAFE—High Security Digital Payment Systems, *ESCORICS 94 (Third European Symposium on Research in Computer Security)* pp. 217-230, 1994.

Chen, Z., How to Write a Java Card Applet: A Developer's Guide, JavaWorld.com, pp. 1-9, Jul. 1, 1999.

Corum, C., Editor, Santa Clara Puts Payments in 'Palm' of Your Hand: Palms and Cellphones Initiate Payments to Campus Card System, CR80News.com, vol./Iss 2, pp. 1-5, May 2003.

Daswani, N et al., SWAPEROO: A Simple Wallet Architecture for Payments, Exchanges, Refunds, and other Operations, *Proceedings of the 3rd USENIX Workshop on Electronic Commerce*, pp. 1-20, Aug. 31, 1998.

Dotzer, F., Aspects of Multi-Application Smart Card Management Systems, *Thesis at the Lehrstuhl fur Dateoverarbeitung(LDV)*, pp. 1-124, Oct. 15, 2002.

Hernandez, R., E-Wallet Architecture and Decentralized Credentials, *Norsk Informatikkonferancse (NIK)*, pp. 1-12, 2003.

Hernandez, R., E-Wallet with Decentralized Credential Keepers, *Master Thesis*, pp. 1-74, Jun. 30, 2003.

Huang, P. et al., Future Personal 'E-Payment': IrFM, *IEEE Wireless Communications*, pp. 1-7, Feb. 2006.

(56) References Cited

OTHER PUBLICATIONS

Langer, J., NFC-Technologie, *Anwendungen and Technik von Near Field Communication (NFC)*, pp. 87-108, Jan. 1, 2010.
Mjolsnes, S., On-Line E-Wallet with Decentralized Credential Keepers, *Mobile networks and Applications*, vol./Iss 8, pp. 87-99, 2003.
ECMA-352 Near Field Communication Interface and Protocol-2 (NFCIP-2)( retrieved from www.ecma-international.org), *ECMA International Standard*, pp. 1-12, Jun. 1, 2010.
Oh, E., International Search Report and Written Opinion for International Patent Application No. PCT/US2012/051641, pp. 1-10, Mar. 25, 2013.
U.S. Appl. No. 13/361,343 to Wall et al. filed Jan. 30, 2012.
U.S. Appl. No. 13/443,683 to Hertel et al. filed Apr. 10, 2012.
U.S. Appl. No. 13/410,209 to Thomas filed Mar. 1, 2012.
Bolton, H., Australian Office Action issued in Application No. 2011336348, pp. 1-3, May 31, 2013.
Chencinski, S., Office Action issued in copending U.S. Appl. No. 13/361,343, filed Jan. 30, 2012, pp. 1-11, Jun. 7, 2013.
Gillmore, A., Australian Office Action issued in Application No. 2012308186, pp. 1-3, Sep. 17, 2013.
Hsieh, P., Office Action issued in copending U.S. Appl. No. 13/443,683, filed Apr. 10, 2012, pp. 1-10, Jul. 5, 2013.
Kang, H. G., International Search Report and Written Opinion issued in Application No. PCT/US2013/035861, pp. 1-12, Jun. 24, 2013.
Bolton, H., Australian Office Action issued in Application No. 2011336348, pp. 1-4, Dec. 19, 2013.
Chencinski, S., Office Action issued in copending U.S. Appl. No. 13/361,343, filed Jan. 30, 2012, pp. 1-11, Dec. 3, 2013.
Kai, T., Japanese Office Action issued in Application No. 2013-542212, pp. 1-11, Jul. 4, 2014.
Rojas, H., Office Action issued in copending U.S. Appl. No. 13/655,321, filed Oct. 18, 2012, pp. 1-13, Dec. 11, 2013.
Byrd, U., Office Action issued in copending U.S. Appl. No. 13/410,209, filed Mar. 1, 2012, pp. 1-21, Dec. 5, 2014.
Hsieh, P., Officer Acion issued in copending U.S. Appl. No. 14/324,416, filed Jul. 7, 2014, pp. 1-17, Oct. 27, 2014.
Wong, C., Canadian Office Action issued in Application No. 2,819,830, pp. 1-6, Nov. 21, 2014.
Yook, S., Korean Office Action issued in Application No. 10-2013-7017123, pp. 1-14, Oct. 7, 2014.

\* cited by examiner

POINT OF SALE PROCESSING INITIATED BY A SINGLE TAP

CROSS REFERENCE TO RELATED APPLICATIONS

This application claims the benefit of priority under 35 U.S.C. §119(e) of U.S. Provisional Patent Application No. 61/525,722, filed Aug. 19, 2011, the entire content of which is incorporated herein by reference.

TECHNICAL FIELD

The present disclosure relates generally to contactless devices and more particularly to methods and systems that allow for point of sale processing and communication of multiple user options initiated by a single initiation of a communication channel.

BACKGROUND

Near Field Communication (NFC) is a proximity communication technology that can enable contactless device payment technologies and that is supported by the Global System for Mobile Communications (GSM) Association. Radio frequency identification (RFID) is another wireless communication technology that can be adapted to enable NFC contactless device payment technology. NFC communication generally is conducted in a range from about 3 to about 4 inches. Such short communication distances limit enable secure communication between close field proximity enabled devices. In operation of an NFC transaction, a user "taps" a contactless device, such as an NFC-enabled mobile phone, to a reader of a point of sale system. The reader recognizes the NFC-enabled device when the device is moved within range of the reader, establishes a secure communication channel with the device, and initiates a payment transaction between the reader and the device. The duration of the transaction is very short and does not easily permit communication of other information or conducting of other services during the transaction. Additionally, the device must be held close to the reader during the entire NFC transaction. NFC contactless payment devices can function as a credit card to enable purchases at the point-of-sale.

NFC contactless payment devices can function as a credit card to enable purchases at the point-of-sale. However, the short duration of conventional methods and systems for contactless payment devices do not enable the utilization of value-added services and user choices. During the conventional transaction, the device and the reader communicate to complete the predefined transaction. Further user input or further transactions, such as user selection of coupons or loyalty rewards or automatic application of those items, is not possible in the predefined NFC transaction. Alternative conventional methods require multiple taps or a tap and hold of the contactless device to enable the utilization of each service, resulting in user inconvenience.

SUMMARY

In certain exemplary aspects, a method of allowing point of sale processing and communication of multiple user options with a single initiation of a contactless transaction comprises a device reader that facilitates a secure and convenient connection with a contactless device. The user taps the contactless device in the device reader's radio frequency field. The device reader and the contactless device establish a secure communication channel. Once a secure communication channel is established, the device reader communicates the purchase to the contactless device. The contactless device begins communication options to the user and confirms value-added services available via a user interface on the device. The contactless device communicates the user's selected value-added service to the device reader and the reader communicates the purchase price of the transaction. The contactless device communicates payment options to the user via the user interface and then communicates the user-selected payment options to the device reader. The contactless device can confirm valid PIN entry before the transaction is authorized. The device reader communicates a digital receipt to the contactless device, and the secure communication is terminated.

These and other aspects, objects, features, and advantages of the exemplary embodiments will become apparent to those having ordinary skill in the art upon consideration of the following detailed description of illustrated exemplary embodiments, which include the best mode of carrying out the invention as presently presented.

DETAILED DESCRIPTION OF EXEMPLARY EMBODIMENTS

Overview

Figure 1:
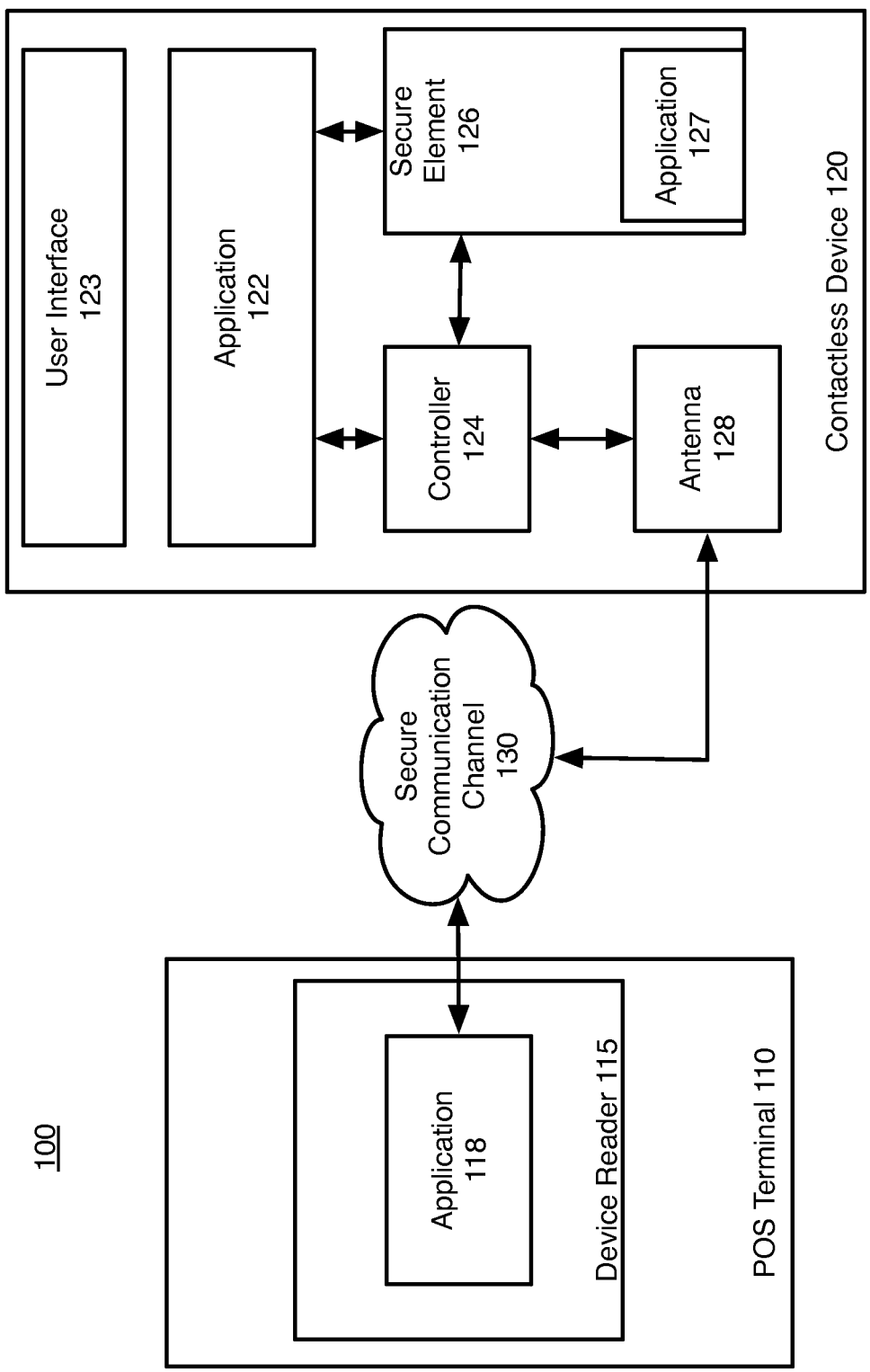
FIG. 1 is a block diagram depicting a system for a point of sale process and communication of multiple user options initiated by a single tap of a contactless device with a point of sale reader device according to an exemplary embodiment.

The exemplary embodiments provide methods and systems that enable users to utilize point of sale processing and communication of multiple user options with a single tap of a contactless device. The user taps the contactless device in the device reader's radio frequency field. The device reader detects the contactless device and establishes a timing protocol for the communication. The device reader requests communication with the contactless device and establishes a number of protocols to enable a secure communication channel. The contactless device accepts the request, and the reader and device establish a secure communication channel via Bluetooth, Wi Fi, or other communication channel suitable for persistent communication via short range. The communication channel allows communication with the reader from outside of the reader's NFC field of communication.

Once a secure communication channel is established, the device reader communicates purchase transaction details to the contactless device, and the contactless device communicates the transaction details to the user via a user interface on the device. The contactless device then determines whether a value-added service is available for the purchase, including, but not limited to, coupons, loyalty cards, check-ins, membership cards, and other forms of non-payment services. The contactless device communicates the value-added service options to the user via the user interface, and the user selects one or more options. The contactless device then communicates the selected option(s) to the device reader. The selection of value-added service options may repeat until there additional value-added service options are not available or are not selected.

The point of sale system applies all user selected options and determines the purchase price of the transaction. The reader communicates the price to the contactless device. The contactless device determines whether a payment-option is available for the purchase, such as gift cards, credit cards, debit cards, prepaid cards, and split-tender transactions (for example, the user can pay x amount of dollars on a gift card and the remainder on another form of payment). The contactless device communicates the payment options to the user via the user interface on the device, and the user selects one or more options. The contactless device then requests personal identification number (PIN) authorization from the user via the user interface on the device. The user enters the PIN authorization via the user interface, and a secure element on the device confirms a valid entry. The contactless device communicates the payment information to the device reader, and the device reader completes the payment and communicates a digital receipt to the contactless device. The secure communication channel is then terminated.

One or more aspects of the invention may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing the invention in computer programming, and the invention should not be construed as limited to any one set of computer program instructions. Further, a skilled programmer would be able to write such a computer program to implement an embodiment of the disclosed invention based on the appended flow charts and associated description in the application text. Therefore, disclosure of a particular set of program code instructions is not considered necessary for an adequate understanding of how to make and use the invention. Further, those skilled in the art will appreciate that one or more aspects of the invention described herein may be performed by hardware, software, or a combination thereof, as may be embodied in one or more computing systems. Moreover, any reference to an act being performed by a computer should not be construed as being performed by a single computer as the act may be performed by more than one computer. The inventive functionality of the invention will be explained in more detail in the following description, read in conjunction with the figures illustrating the program flow.

Turning now to the drawings, in which like numerals indicate like (but not necessarily identical) elements throughout the figures and exemplary embodiments are described in detail.

System Architecture

FIG. 1 is a block diagram depicting a system 100 for a point of sale process and communication of multiple user options initiated by a single tap of a contactless device 120 with a point of sale reader 115 according to an exemplary embodiment. As depicted in FIG. 1, the exemplary operating environment 100 includes a merchant point of sale (POS) terminal system 110 and a contactless device system 120 that are configured to communicate with one another via one or more secure communication channels 130.

The secure communication channel 130 includes a telecommunication means by which network devices (including devices 110 and 120) can exchange data. For example, each connection can include a local area network (LAN), a wide area network (WAN), an intranet, an Internet, a mobile telephone network, a personal area network (PAN) or any combination thereof. Throughout this specification, it should be understood that the terms "data" and "information" are used interchangeably herein to refer to text, images, audio, video, or any other form of information that can exist in a computer-based environment. In exemplary embodiments, the secure communication channel comprises a proximity communication connection, such as Bluetooth. Bluetooth can enable the exchange of data over short distances through the creation of PANs with high levels of security. Wi-Fi is yet another proximity communication type wherein contactless devices can communicate via a wireless ad hoc network.

The POS terminal system 110 includes a device reader 115 that is capable of communicating with the contactless device system 120 and the merchant POS terminal 110 via an application 118. In an exemplary embodiment the device reader 115 communicates with the contactless device 120 using a Bluetooth communication method. In another exemplary embodiment, the device reader 115 communicates with the contactless device 120 using a Wi-Fi communication method. In yet another embodiment, the device reader 115 communicates with the contactless device 120 using a near field communication (NFC) communication method. While the device reader 115 is depicted as an integrated part of the POS terminal 110, the device reader 115 may also be a standalone hardware device, in accordance with alternative exemplary embodiments.

In an exemplary embodiment, the contactless device system 120 can refer to a smart device that can communicate via an electronic, magnetic, or radio frequency field between the device and another device, such as a terminal reader 115. In an exemplary embodiment, the contactless device 120 has processing capabilities, such as storage capacity/memory and one or more application 122 that can perform a particular function. In an exemplary embodiment, the contactless device 120 contains an operating system (not illustrated) and user interface 123. Exemplary contactless devices 120 include smart phones; mobile phones; PDAs; mobile computing devices, such as netbooks and iPads; other electronically enabled key fobs; electronically enabled credit card type cards; and other devices, in each case having processing and user interface functionality. Certain contactless devices 120 can be used for multiple purposes, including financial transactions, coupons, ticketing, secure authentication, and other related applications.

The secure element can exist within a removable smart chip or a secure digital (SD) card, or can be embedded within a fixed chip on the device 120. In certain exemplary embodiments, Subscribed Identity Module (SIM) cards may be capable of hosting a secure element 126, for example, an NFC SIM Card. The secure element allows a wallet software application or other application 122 resident on the device 120 and accessible by the device user to interact securely with certain functions within the secure element, while protecting information stored within the secure element. The secure element 126 comprises applications 127 running thereon that perform the functionality described herein.

The secure element 126 includes components typical of a smart card such as crypto processors and random generators. In an exemplary embodiment, the secure element 126 comprises a Smart MX type NFC controller 124 in a highly secure system on a chip controlled by a smart card operating system, such as a JavaCard Open Platform (JCOP) operating system. In another exemplary embodiment, the secure element 126 is configured to include a non-EMV type contactless smart card, such as an optional implementation.

The secure element 126 communicates with the controller 124 and the application 122 in the contactless device 120. In an exemplary embodiment, the secure element 126 is capable of storing encrypted user information and only allowing trusted applications to access the stored information. The controller 124 interacts with a secure key encrypted application 122 for decryption and installation in the secure element 126. In an exemplary embodiment, the controller 124 is a Bluetooth link controller. The Bluetooth link controller may be capable of sending and receiving data, identifying the device reader 115, performing authentication and ciphering functions, and directing how the contactless device 120 will listen for transmissions from the device reader 115 or configure the contactless device 120 into various power-save modes according to the Bluetooth-specified procedures. In another exemplary embodiment, the controller 124 is a Wi-Fi controller or an NFC controller capable of performing similar functions.

The application 122 is a program, function, routine, applet or similar entity that exists on and performs its operations on a contactless device 120. For example, the application 122 may be one or more of a digital wallet application, a coupon application, a loyalty card application, another value-added application, a user interface application, or other suitable application operating on the contactless device 120. Additionally, the secure element 126 also may comprise secure contactless software applications, such as payment applications, secure forms of the applications 122, authentication applications, payment provisioning applications, or other suitable application using the secure functionality of the secure element.

The contactless device 120 communicates with the reader 115 via an antenna 128. In an exemplary embodiment, once the contactless device application 122 has been activated and prioritized, the controller 124 is notified of the state of readiness of the contactless device 120 for a transaction. The controller 124 outputs through the antenna 128 a radio signal, or listens for radio signals from the device reader 115. On establishing a secure communication channel between the contactless device 120 and the device reader 115, the device reader 115 requests the list of available applications 127 from the secure element 126. A directory is first displayed, after which, based on the set priority or the type of device reader 115, an application 127 is chosen and initiated for the transaction. The method for processing a point of sale transaction and communication of multiple user options initiated by a single tap is described in more detail hereinafter with reference to the methods described in FIGS. 2-4.

System Process

Figure 2:
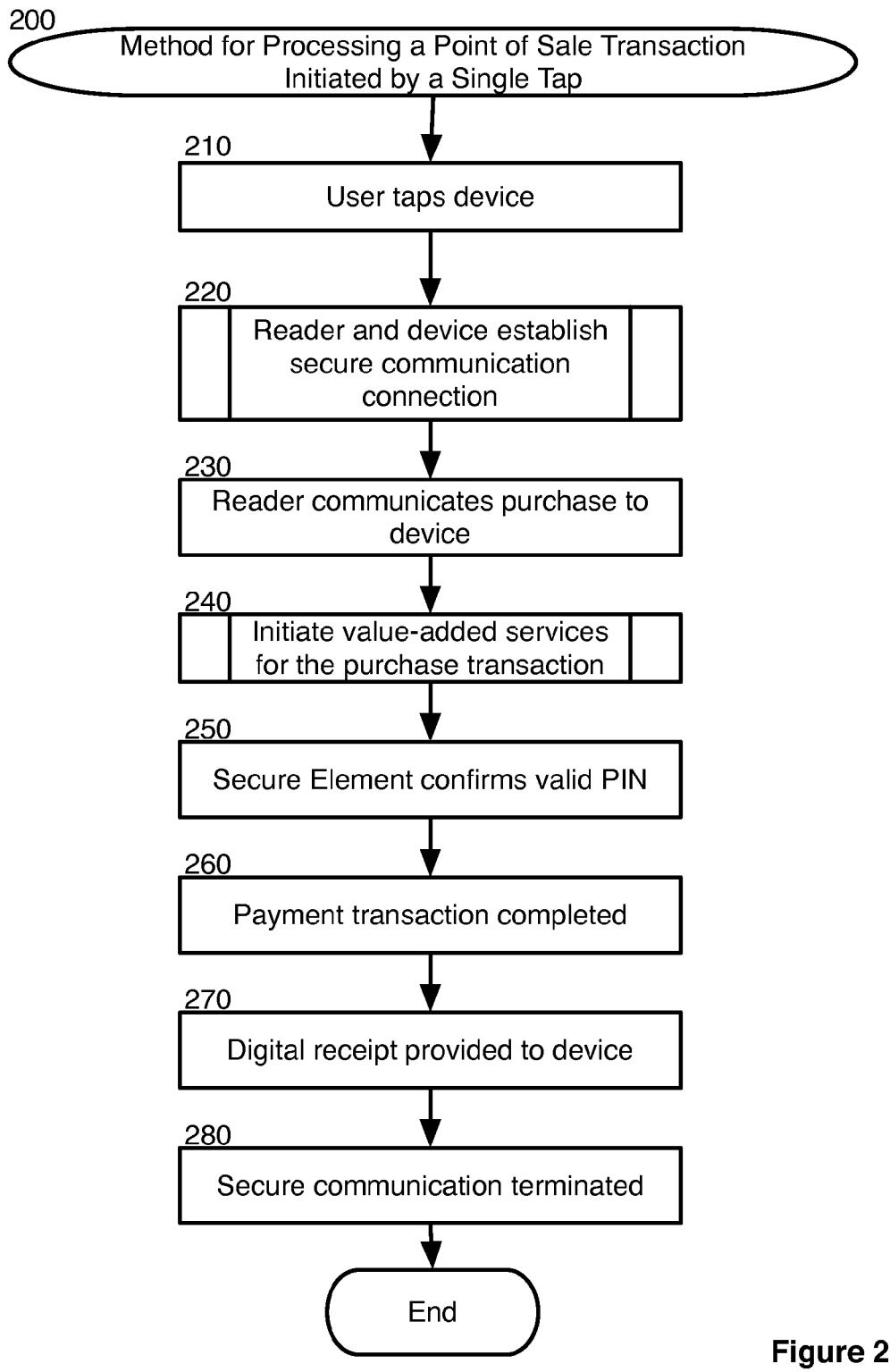
FIG. 2 is a block flow diagram depicting a method for processing a point of sale transaction and multiple user options initiated by a single tap of a contactless device with a point of sale reader device according to an exemplary embodiment.

FIG. 2 is a block flow diagram depicting a method for processing a point of sale transaction and multiple user options initiated by a single tap of a contactless device with a POS reader according to an exemplary embodiment. The method 200 is described with reference to the components illustrated in FIG. 1.

In block 210, the user "taps" the contactless device 120 in the proximity of the device reader 115. In an exemplary embodiment, the device reader 115 generates a radio frequency (RF) or other field continuously polling for the presence of a contactless device 120, and the user "taps" the contactless device by placing the device 120 within the field of the reader 115. In an alternative exemplary embodiment, the contactless device 120 generates a radio frequency (RF) or other field continuously polling for the presence of a device reader 115, and the user "taps" the contactless device by placing the device 120 in proximity of the reader 115.

The device reader 115 detects the contactless device 120 and establishes a secure communication channel in block 220. In an alternative exemplary embodiment, the contactless device 120 detects the device reader 115 and establishes a secure communication channel. The method for establishing a secure communication channel is described in more detail hereinafter with reference to the methods described in FIG. 3.

Figure 3:
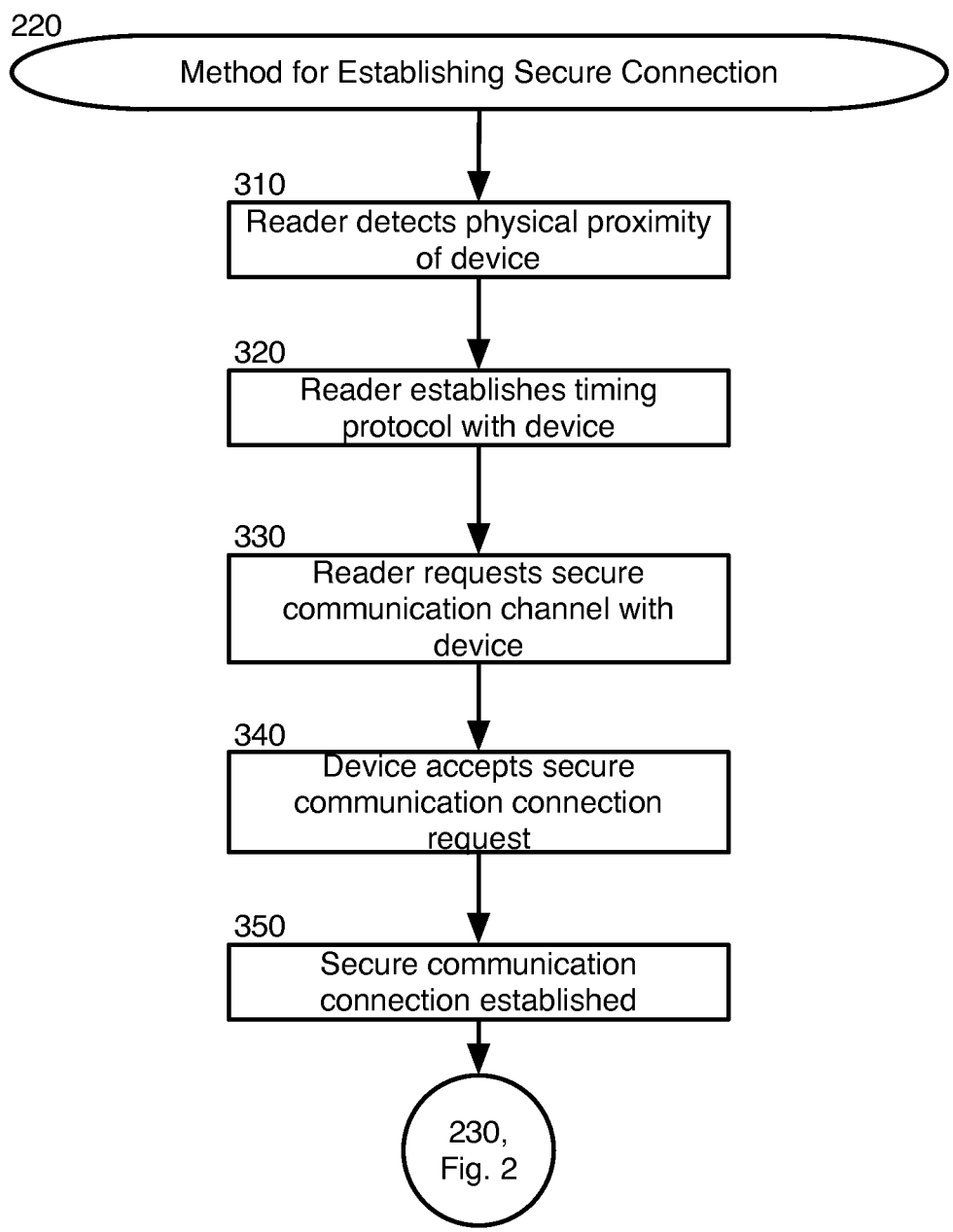
FIG. 3 is a block flow diagram depicting a method for establishing a secure communication channel between the device reader and the contactless device according to an exemplary embodiment.

FIG. 3 is a block flow diagram depicting a method for establishing a secure communication channel between the device reader 115 and the contactless device 120 according to an exemplary embodiment. The method 220 is described with reference to the components illustrated in FIG. 1.

After the user taps the contactless device 120 in the proximity of the device reader 115, the device reader 115 detects the physical proximity of the contactless device 120 in block 310. In an exemplary embodiment, the detection of the physical proximity of the contactless device 120 ensures that the device reader 115 is communicating with only one contactless device and that the contactless device is physically present within the field of the reader 110. In an exemplary embodiment, the reader 115 and the device 120 may initially interact via NFC protocols whereby the reader detects the presence of the device 120 and requests communication therewith. In an alternative exemplary embodiment, the contactless device 120 detects the physical proximity of the device reader 115.

In block 320, the device reader 115 initiates a timing protocol with the contactless device 120. In an alternative exemplary embodiment, the contactless device 120 initiates a timing protocol with the device reader 115. The timing protocol specifies a time period within which communications between the reader 115 and the device 120 must occur to indicate that the device 120 is physically present at the reader 115. In an exemplary embodiment, the detection of physical proximity provides a security measure. The initiation of the timing protocol is used to ensure communication with the contactless device 120 is not done through a proxy device, wherein the information contained on the contactless device 120 was copied onto a proxy device in an effort to masquerade and commit a fraudulent act. The timing protocol ensures communication with a single device and detects additional time that would be required to communicate through a proxy device, thereby determining whether the device 120 is physically present at the reader 115. In another exemplary embodiment, the timing protocol can establish a period of inactivity that will terminate the communication between the contactless device 120 and the device reader 115 once a secure communication channel is established. After determining that the reader 115 is communicating with a physically present device 120, the method 220 proceeds to block 330. If the reader 115 determines in block 320 that the device 120 is not physically present, then the method 220 (and thus the method 200) terminates.

The information communicated during the initial NFC communication channel depends on the type of secure protocol being used with the secondary communication channel. In an exemplary embodiment, the contactless device 120 and the device reader 115 may have a pre-existing relation established. The initial NFC communication channel initiates the communication between the devices (115 and 120) by providing a prompt to switch to a different secondary communication channel. In an alternative exemplary embodiment, the devices (115 and 120) exchange a key during the initial NFC communication to set up a secondary secure communication channel.

In block 330, the device reader 115 requests a secure communication channel with the contactless device 120. In an exemplary embodiment, the device reader 115 and the contactless device 120 can establish any number of protocols to enable a secure communication channel, including but not limited to Bluetooth protocols such as a link management protocol (LMP), logical link control and adaptation protocol (L2CAP), and service discovery protocol (SDP). In an exemplary embodiment, Bluetooth pairing of the reader 114 and the device 120 can occur automatically by such communication. In another exemplary embodiment, the contactless device 120 may present the user with an interface requesting authorization to successfully pair the contactless device 120 and the device reader 115 to enable a Bluetooth communication. Such Bluetooth communications include secure communication functionality. In an alternative exemplary embodiment, the contactless device 120 requests a secure communication channel with the device reader 115.

In another exemplary embodiment, the reader may present a Wi-Fi connection to which the device 120 can connect, which connection can occur automatically or via user authorization as described previously with regard to the Bluetooth embodiment. A Wi-Fi connection can comprise secure communication functionality, such as cryptographic protocols, including transport layer security or secure socket layer protocols, or other secure communication methodology.

In block 340, the contactless device 120 accepts the secure communication channel request from the device reader 115, and a secure communication channel is established in block 350. In an alternative exemplary embodiment, the device reader 115 accepts the secure communication channel request from the contactless device 120. During this process, the device 120 and the reader 115 may establish a relationship by creating an encryption key for use in encrypting communications there between.

As described previously, the secure communication can be established in exemplary embodiments via Bluetooth or Wi-Fi. Such secure communications can provide benefits over an NFC type connection. For example, such secure communications can remain open for ranges farther than the limited 3-4 inch range of NFC communications. Additionally, such secure communications can remain open for longer time periods, for example, until terminated by the reader 115, the device 120, or by user input into the device 120. In certain exemplary embodiments, the original NFC communication channel and the secondary Bluetooth or Wi-Fi communication channels can co-exist for a period of time (for example, the NFC communication channel may be used to boost a higher bandwidth for the secondary communication channel or authentication may be completed using the original NFC communication channel while establishing the secondary communication channel).

From block 350, the method 220 proceeds to block 230 (FIG. 2).

Returning to FIG. 2, in block 230, the device reader 115 communicates purchase information to the contactless device 120 through the secure communication channel 130 established in block 220. In an exemplary embodiment, the device reader 115 communicates a list of items or services purchased. In another exemplary embodiment, the device reader 115 also communicates the preliminary total of the purchase to the contactless device 120. The purchase information also can comprise merchant name, payment forms accepted, merchant loyalty rewards program identification, merchant location, or other suitable purchase information related to the transaction being conducted at the point of sale system 110.

The contactless device 120 receives the purchase information from the device reader 115 and initiates value-added services for the purchase transaction in block 240. The method 240 for initiating value-added services for the purchase transaction is described in more detail hereinafter with reference to the methods described in FIG. 4.

Figure 4:
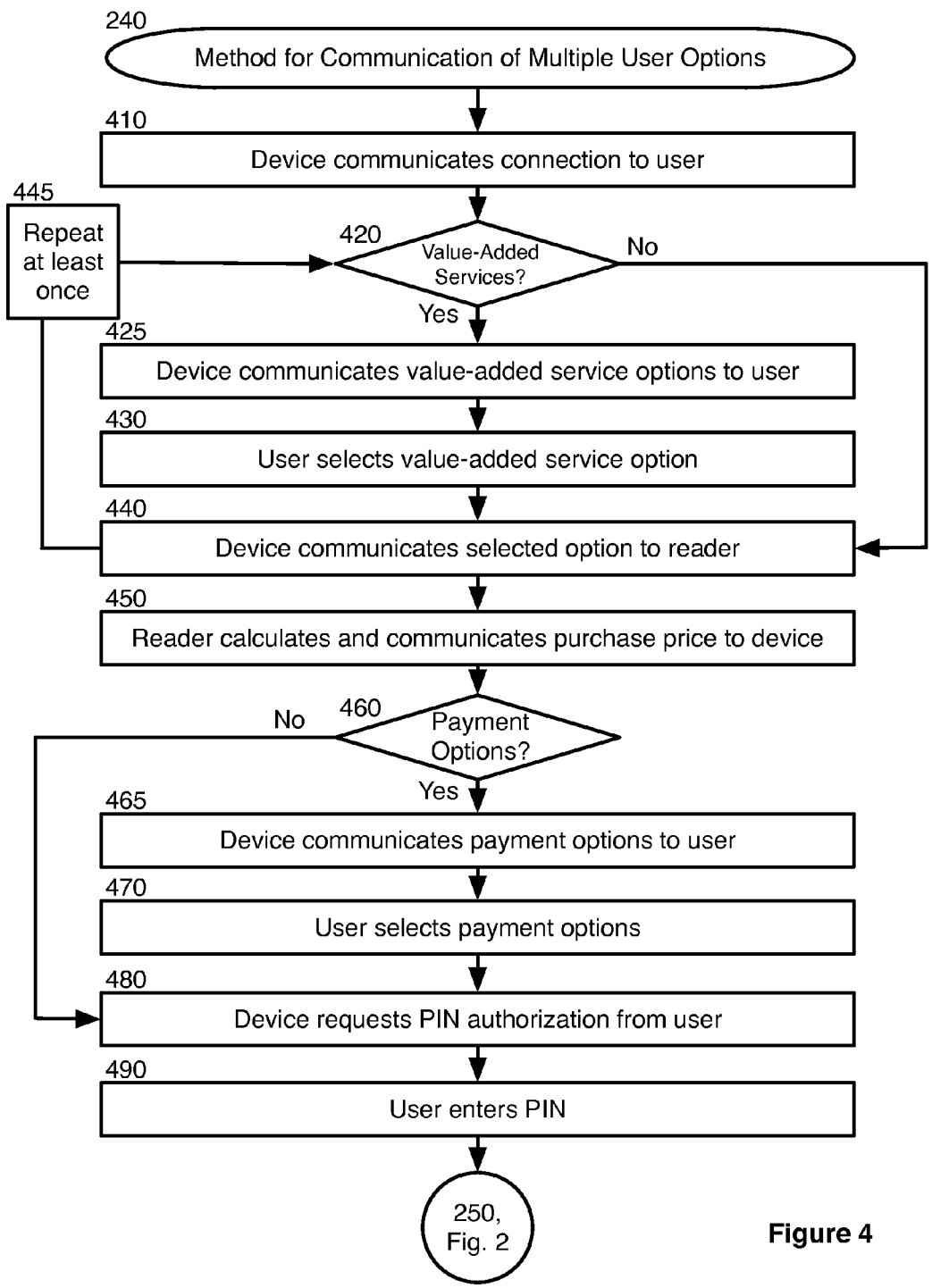
FIG. 4 is a block flow diagram depicting a method for initiating value-added services for the purchase transaction according to an exemplary embodiment.

FIG. 4 is a block flow diagram depicting a method 240 for initiating value-added services for the purchase transaction according to an exemplary embodiment. The method 240 is described with reference to the components illustrated in FIG. 1.

After the contactless device 120 receives the purchase information from the device reader 115, the contactless device 120 communicates the purchase information 130 to the user in block 410, via a user interface 123 of the device 120. In an exemplary embodiment, the contactless device 120 communicates the purchase information received from the device reader 115 in block 230 and initiates an interaction with the user to present value-added service options, or other options, available for selection. In an exemplary embodiment, the application 122 is engaged and processes the purchase information received from the device reader 115 to present the purchase information via the user interface 123. The application 122 may create a list of options available to the user based on the purchase information and the information stored in the application 122. In another exemplary embodiment, the application 122 creates a series of prompts requesting user choices for the available options.

At block 420, the contactless device 120 determines whether a value-added service is available for the purchase, including, but not limited to, coupons, loyalty cards, check-ins, membership cards, ticketing, and other forms of value-added services. In an exemplary embodiment, the contactless device 120 reviews the list of options and determines if any value-added service options are available. For example, the application 122 can store various value-added services. Alternatively or additionally, the secure element 126 may store various value-added services or the confidential information relating to such value added services. The application 122 can review the list of available value added services of the application 122 and the secure element 126 to identify any value-added services for the purchase transaction. As an example, the user may have stored a coupon for the merchant or the product being purchased in the device 120. The application 122 will identify the coupon for the purchase transaction. As another example, the application can identify loyalty points collected by the user for this merchant, determine if the loyalty points can be redeemed in the purchase transaction, and, if so, identify the loyalty points for the purchase transaction.

If the contactless device 120 determines in block 410, that value-added service options are available, the contactless device 120 communicates one or more value-added service option to the user in block 425 via the user interface 123. In an exemplary embodiment, the contactless device 120 creates a priority list of value-added service options and communicates the first service option to the user. In another exemplary embodiment, the user pre-selects an order of the value-added service options using the application 122 when registering and/or configuring the application 122. Additionally, multiple value-added service options may be presented for selection by the user. In an exemplary embodiment, the value-added service options are present in the form of a pop-up prompt or window on the contactless device 120. In another exemplary embodiment, the application 122 is automatically opened and the options are displayed on the contactless device 120.

In block 430, the user selects a value-added service option. In an exemplary embodiment, the user interacts with the touch-screen of a smart phone to select a value-added service option. In another exemplary embodiment, the user may select the button that corresponds to the selected value-added service option.

The contactless device 120 communicates the selected value-added service option to the device reader in block 440. In an exemplary embodiment, the communication is through the secure communication channel 130 established between the contactless device 120 and the device reader 115.

The contactless device 120 then repeats this process in block 445, determining whether another value-added service option is available for the use at block 420, communicating the value-added service options to the user in block 430, receiving the user's selected option in block 440 and communicating the selected option to the device reader 115 in block 440. The process is repeated at least one time until there additional value-added service options are not available or are not selected. In another exemplary embodiment, all the value-added services are presented to the user at one time, and the user can select all desired value added services without repeating the process.

Once all the value-added service options have been presented and selected by the user, the contactless device 120 communicates to the device reader 115 in block 440 that additional value-added services will not be used.

The device reader 115 processes the selected value-added service options, calculates the total of the purchase transaction, and communicates the total to the contactless device 120 in block 450. In an exemplary embodiment, the device reader 115 applies any coupons, loyalty rewards, membership card information, other discounts, or other transaction actions and adjusts the purchase price accordingly. Although described throughout this specification as the reader 110 performing specific functions, such functions may be performed by the application 118 and/or the POS terminal 110 and communicated to the device 120 via the reader 115.

At block 460, the contactless device 120 receives the purchase total from the device reader 115 and determines whether the user has different payment options, including but not limited to gift cards, credit cards, debit cards, prepaid cards, and split-tender transactions (for example the user can pay x amount of dollars on a gift card and the remainder on another form of payment). In an exemplary embodiment, the contactless device 120 reviews a list of payment options available via the secure element 126.

If the contactless device 120 determines in block 460 that multiple payment options are available, the contactless device 120 communicates the payment options to the user in block 465 via the user interface 123. In an exemplary embodiment, the contactless device 120 creates a priority list of payment options and communicates the options to the user. In another exemplary embodiment, the user pre-selects the order of the payment options using the application 122 when registering and/or configuring the application 122. In an exemplary embodiment, the payment options are present in the form of a pop-up prompt on the contactless device 120. In another exemplary embodiment, the application 122 is automatically opened and the options are displayed on the contactless device 120. Payment options may be presented in the predetermined order, or all payment options may be presented simultaneously for selection by the user.

In block 470, the user selects one or more payment service options. In an exemplary embodiment, the user interacts with the touch-screen of the contactless device 120 to select a payment option. In another exemplary embodiment, the user may select the button that corresponds to the selected payment option. The user may select multiple payment options, such as a gift card for the merchant or other stored value card, a debit card, a debit card, or other suitable electronic payment method.

The contactless device 120 requests a PIN authorization from the user in block 480. In an exemplary embodiment, the PIN authorization is created when the user registers/configures the application 122 and/or the applications 127 on the secure element 126 corresponding to each payment method. Block 480 is required only if a particular payment method requires PIN authorization.

Referring back to block 460, if the contactless device 120 determines that only a single payment option exists, options are not communicated to the user and the contactless device 120 requests a PIN authorization from the user in block 480 for the only available payment method identified.

In block 490, the user enters the PIN authorization. In an exemplary embodiment, the user uses a keypad, touchscreen, or other input mechanism of the contactless device 120 to enter the PIN authorization.

In the exemplary embodiment depicted in FIG. 4, the user selects all desired payment options that are then communicated together to the reader 115 (see block 260 in FIG. 2). Alternatively, the user may select a payment method, which is communicated to the reader 115 and processed via block 260 (FIG. 2). Then, the method 240 (or portions of the method 240) may be repeated for the user to select another payment method for the remaining balance of the purchase transaction. In this manner, the user may apply individually multiple payment methods.

From block 490, the method 250 proceeds to block 250 (FIG. 2).

The secure element 126 then confirms a valid PIN authorization in block 250. In an exemplary embodiment, the secure element 126 will notify the user of an incorrect PIN authorization entry. The user may then be prompted to enter a new PIN authorization. In an exemplary embodiment, the contactless device 120 has established a safety protocol for determining the number of incorrect PIN authorizations allowed before the communication is terminated. In an exemplary embodiment, the PIN authorization is established during the registration/configuration of the application 122 and is encrypted/saved in the secure element 126.

In block 260, the payment transaction is completed. In an exemplary embodiment, the contactless device 120 communicates the payment information to the device reader 115 via the secure communication channel 130. In an exemplary embodiment, the POS terminal 110 processes the transaction and confirms payment. If multiple payment methods are selected, the POS terminal 110 processes each payment in the specified order or a predetermined order to complete the payment transaction.

The device reader 115 communicates a digital receipt to the contactless device 120 in block 270. In an exemplary embodiment, the digital receipt can include a list of products purchased, a description of each product purchased, the price for each product purchased, a product category for each product purchased, a total price, a stock keeping unit ("SKU") or similar identifier for each product purchased, discounts applied, the time and/or date of purchase, warranty information for the products purchased, or other suitable information. The digital receipt can also include information regarding the merchant, including the name of the merchant, the merchant's address, the merchant's telephone number, and any other suitable information regarding the merchant. In an exemplary embodiment, the receipt includes a list of options selected by the user. As used throughout this specification, the term "product" should be interpreted to include tangible and intangible products, as well as services.

In block 280, the contactless device receives the digital receipt, and the secure communication channel 130 is terminated.

In an exemplary embodiment, the original NFC connection can be terminated when the request to establish a secure communication channel between the reader 115 and the device 120 is communicated, or any suitable time thereafter.

General

The exemplary methods and blocks described in the embodiments presented previously are illustrative, and, in alternative embodiments, certain blocks can be performed in a different order, in parallel with one another, omitted entirely, and/or combined between different exemplary methods, and/or certain additional blocks can be performed, without departing from the scope and spirit of the invention. Accordingly, such alternative embodiments are included in the invention described herein.

The invention can be used with computer hardware and software that performs the methods and processing functions described above. As will be appreciated by those having ordinary skill in the art, the systems, methods, and procedures described herein can be embodied in a programmable computer, computer executable software, or digital circuitry. The software can be stored on computer readable media. For example, computer readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays ("FPGA"), etc.

Although specific embodiments of the invention have been described above in detail, the description is merely for purposes of illustration. Various modifications of, and equivalent blocks corresponding to, the disclosed aspects of the exemplary embodiments, in addition to those described above, can be made by those having ordinary skill in the art without departing from the spirit and scope of the invention defined in the following claims, the scope of which is to be accorded the broadest interpretation so as to encompass such modifications and equivalent structures.

What is claimed is:

1. A computer-implemented method for point of sale (POS) processing, the method comprising:
    detecting, using one or more computing devices, proximity between a device for a contactless communication and a POS device using a near field communications (NFC) channel;
    establishing, using the one or more computing devices, an non-NFC wireless communications channel between the detected proximate POS device and the device for contactless communication; and
    communicating, using the one or more computing devices, at least one of purchase information and value-added services information between the POS device and the device for contactless communication at least in part via the established non-NFC wireless communications channel;
    wherein both the NFC channel and the non-NFC wireless communications channel are actively communicating during a common period of time.

2. The method of claim 1, wherein the NFC channel is used to supplement the bandwidth provided by the non-NFC wireless communications channel.

3. The method of claim 1, wherein the NFC channel is used to complete authentication during the common period of time.

4. The method of claim 1, wherein establishing comprises initiating, by the POS device, the non-NFC wireless communications channel.

5. The method of claim 1, wherein communicating comprises:
    receiving, by the POS device, information regarding value-added services supported by the device for contactless communication, and
    conducting a value-added service identified as supported by the device for contactless communication.

6. The method of claim 1, further comprising conducting at least one of a purchase and a value-added services at least in part via NFC.

7. The method of claim 1, wherein a period for establishing the non-NFC wireless communications channel is limited by a timing protocol between the POS device and the device for contactless communication.

8. A computer program product, comprising:
    a non-transitory computer-executable storage device having computer-readable program instructions embodied thereon that when executed by a computer perform a method for point of sale (POS) processing comprising:
        detecting, using one or more computing devices, proximity between a device for a contactless communication and a POS device using a near field communications (NFC) channel;
        establishing, using the one or more computing devices, an non-NFC wireless communications channel between the detected proximate POS device and the device for contactless communication; and
        communicating, using the one or more computing devices, at least one of purchase information and value-added services information between the POS device and the device for contactless communication at least in part via the established non-NFC wireless communications channel;
        wherein both the NFC channel and the non-NFC wireless communications channel are actively communicating during a common period of time.

9. The computer program product of claim 8, wherein the NFC channel is used to supplement the bandwidth provided by the non-NFC wireless communications channel.

10. The computer program product of claim 8, wherein the NFC channel is used to complete authentication during the common period of time.

11. The computer program product of claim 8, wherein establishing comprises initiating, by the POS device, the non-NFC wireless communications channel.

12. The computer program product of claim 8, wherein communicating comprises:
    receiving, by the POS device, information regarding value-added services supported by the device for contactless communication, and
    conducting a value-added service identified as supported by the device for contactless communication.

13. The computer program product of claim 8, further comprising computer-readable program instructions for conducting at least one of a purchase and a value-added services at least in part via NFC.

14. The computer program product of claim 8, wherein a period for establishing the non-NFC wireless communications channel is limited by a timing protocol between the POS device and the device for contactless communication.

15. A system to conduct point of sale (POS) processing, the system comprising:
- a storage resource;
- a network module; and
- a processor communicatively coupled to the storage resource and the network module, wherein the processor executes computer-readable instructions that are stored in the storage resource and that cause the system to:
  - detect proximity between a device for a contactless communication and a POS device using a near field communications (NFC) channel;
  - establish an non-NFC wireless communications channel between the detected proximate POS device and the device for contactless communication; and
  - communicate at least one of purchase information and value-added services information between the POS device and the device for contactless communication at least in part via the established non-NFC wireless communications channel;
- wherein both the NFC channel and the non-NFC wireless communications channel are actively communicating during a common period of time.

16. The system of claim 15, wherein the NFC channel is used to supplement the bandwidth provided by the non-NFC wireless communications channel.

17. The system of claim 15, wherein the NFC channel is used to complete authentication during the common period of time.

18. The system of claim 15, wherein establishing comprises initiating, by the POS device, the non-NFC wireless communications channel.

19. The system of claim 15, wherein communicating comprises:
- receiving, by the POS device, information regarding value-added services supported by the device for contactless communication, and
- conducting a value-added service identified as supported by the device for contactless communication.

20. The system of claim 15, further comprising computer-readable program instructions for conducting at least one of a purchase and a value-added services at least in part via NFC.

21. The system of claim 15, wherein a period for establishing the non-NFC wireless communications channel is limited by a timing protocol between the POS device and the device for contactless communication.

* * * * *